United States Patent
McCarthy et al.

(10) Patent No.: US 6,814,534 B1
(45) Date of Patent: Nov. 9, 2004

(54) APPARATUS AND METHOD FOR STACKING FOOD PORTIONS

(75) Inventors: John T. McCarthy, 416 Nance Rd., Stanfield, NC (US) 28163; Michael D. Christy, Locust, NC (US); Sean T. McCarthy, Locust, NC (US); Jay P. Phillips, Concord, NC (US)

(73) Assignee: John T. McCarthy, Stanfield, NC (US)

( * ) Notice: Subject to any disclaimer, the term of this patent is extended or adjusted under 35 U.S.C. 154(b) by 32 days.

(21) Appl. No.: 10/185,617

(22) Filed: Jun. 28, 2002

Related U.S. Application Data

(63) Continuation-in-part of application No. 10/107,845, filed on Mar. 27, 2002.

(51) Int. Cl.[7] ............................................. B65G 57/00
(52) U.S. Cl. ................................ 414/798.5; 414/798.2
(58) Field of Search .......................... 414/798.2, 798.5, 414/798.6, 798.7; 198/408

(56) References Cited

U.S. PATENT DOCUMENTS

| | | | |
|---|---|---|---|
| 2,687,207 A | 8/1954 | Meyer | 198/35 |
| 2,748,917 A | 6/1956 | Rawe | 198/35 |
| 3,359,874 A | 12/1967 | Stegenga et al. | 93/93 |
| 3,531,108 A | 9/1970 | Rabinow et al. | 271/64 |
| 3,610,401 A | 10/1971 | Herendeen et al. | 198/35 |
| 3,842,719 A | 10/1974 | Fernandez-Rana et al. | 93/93 M |
| 3,870,139 A | 3/1975 | Wagner | 198/34 |
| 3,948,153 A | 4/1976 | Dutro et al. | 93/93 C |
| 3,964,598 A | 6/1976 | Alsop | 198/35 |
| 3,983,987 A | 10/1976 | Lynch | 198/480 |
| 3,998,339 A | 12/1976 | Booth | 214/6 D |
| 4,125,253 A * | 11/1978 | Wangermann | 414/794.4 |
| 4,132,304 A | 1/1979 | Gent et al. | 198/432 |
| 4,135,616 A | 1/1979 | Pellaton | 198/423 |
| 4,231,465 A | 11/1980 | Bourgeois | 198/460 |
| 4,266,654 A | 5/1981 | Achelpohl et al. | 198/425 |
| 4,360,098 A | 11/1982 | Nordstrom | 198/419 |
| 4,522,387 A | 6/1985 | Leuthold | 271/187 |
| 4,595,193 A | 6/1986 | Nakamura | 271/187 |
| 4,610,347 A | 9/1986 | Inoko | 198/425 |
| 4,652,197 A | 3/1987 | Littleton | 414/50 |
| 4,736,936 A | 4/1988 | Hertel et al. | 270/58 |
| 4,759,433 A | 7/1988 | Kraft | 198/422 |
| 4,868,471 A | 9/1989 | Braithwaite | 318/567 |
| 4,921,088 A | 5/1990 | Ter Horst | 198/418.7 |
| 5,000,436 A | 3/1991 | Holmes | 271/178 |
| 5,020,305 A | 6/1991 | Treiber | 53/500 |
| 5,040,662 A * | 8/1991 | Clark et al. | 198/408 |
| 5,040,783 A | 8/1991 | Ruehl | 271/300 |
| 5,064,050 A | 11/1991 | Stadler | 198/459 |
| 5,100,124 A | 3/1992 | Pouliquen | 271/183 |
| 5,667,055 A | 9/1997 | Gambetti | 198/419.3 |
| 5,810,550 A | 9/1998 | Reaves | 414/788.1 |

* cited by examiner

Primary Examiner—Donald W. Underwood
(74) Attorney, Agent, or Firm—Womble Carlyle Sandridge & Rice, PLLC

(57) ABSTRACT

An apparatus for stacking substantially rigid food portions in preparation for packaging, and without human intervention, including a conveyor for receiving and moving food portions, at least one counter for counting each of the food portions as the food portion is moved by the conveyor, and a rotary transporter having multiple generally right-angled notches for receiving food portions from the conveyor and moving the food portions into a stack. The conveyor, counter, and rotary transporter are cooperatively interconnected by a programmable computer so that a predetermined number of food portions is moved from the conveyor onto the transporter, where the transporter moves the food portions into a substantially horizontal stack of vertically oriented food portions.

17 Claims, 8 Drawing Sheets

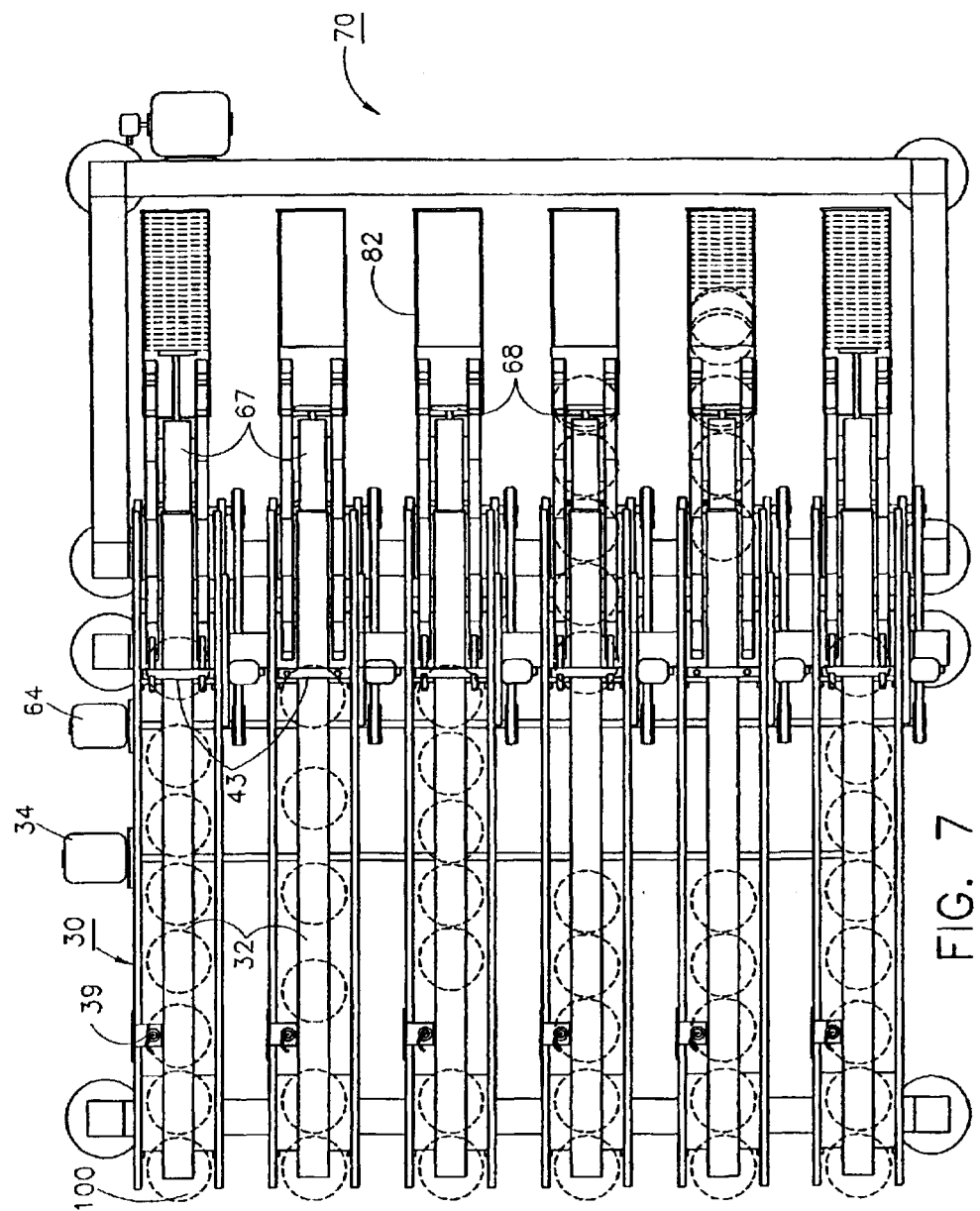

APPARATUS AND METHOD FOR STACKING FOOD PORTIONS

RELATED APPLICATIONS

This application is a continuation-in-part of U.S. application Ser. No. 10/107,845, filed Mar. 27, 2002, the content of which is hereby incorporated in its entirety.

FIELD OF THE INVENTION

The present invention relates to the field of food handling and packaging, and, more particularly to an apparatus and method for stacking frozen food portions, such as hamburger patties or the like, in preparation for packaging, and without the need for human contact.

BACKGROUND OF THE INVENTION

Numerous advances have been made in the food processing and packaging industries over the last several decades. These advances, in large part, have been directed to automated handling and packaging systems for increasing the "assembly line" output, i.e., volume, of the food processing operation. Examples include machines for filling and sealing containers, stackers, sorters, and counters/measurement devices. Primary objectives of these systems have been cost reduction and accuracy. A large number of these systems have also been devised for use with final, processed, foods such as snacks, beverages, processed canned products, etc.

A different set of problems has evolved in recent years with respect to the handling and packaging of uncooked, or raw, food products, particularly meats. Concerns of tainted, or contaminated meat due to improper handling and processing of the raw meat products, such as $E.\ coli$, have given rise to increased governmental oversight. Additionally, concerns associated with human contact and the passage of human contamination during the cooking stage and service of food products have prompted higher workplace standards. One notable example is the passage of hepatitis. As fast food restaurants and the like have proliferated, so have the concerns over tainted food and incidents of food poisoning. Accordingly, product liability issues have arisen. Food processors and packagers are bearing high costs from the liabilities associated with human contact, and hence, contamination.

Yet, despite the advances made in automation and packaging, there have not heretofore been effective, practical, and efficient ways to eliminate human contact with raw meat products. At some point in the forming and packaging process, human contact with raw product has been necessary. Meat packers have, thus, found themselves increasingly culpable when cases of contamination arise, and have borne substantial losses over precautionary recalls of products when the source of the contamination has been indeterminate.

There are rotably mounted stacking devices known in the art for the stacking of paper, napkins, and the like with spiral-shaped slots for receiving and transporting the items to be stacked. The spiral configurations facilitate the stacking of the items in substantially vertical stacks. Because of the flexible nature of such items, the angular relationships of the slots to the vertical slots are critical to the proper functioning of the devices. As a result, the devices are quite complex and not suitable for the transport and stacking of semi-rigid or rigid items, such as food portions.

There is now known an apparatus for stacking predetermined numbers of food portions without the need for human contact; however, the apparatus requires multiple conveying belts, counters, and gates, all which must be synchronized and electronically interconnected. While the apparatus effectively stacks selected food portions, it is mechanically and electronically complex, and expensive to construct and maintain.

SUMMARY OF THE INVENTION

The present invention is directed to an apparatus for efficiently stacking predetermined numbers of food portions, such as frozen hamburger patties, received from bulk bins, or directly from a freezer, in preparation for subsequent packaging, and without the need for human contact.

In a preferred embodiment, the apparatus for stacking food patties includes a conveyor, a rotary transporter, and a receiving assembly. In one embodiment, the conveyor comprises a receiving conveying belt that receives flat, frozen patties from a bulk bin, hopper, or freezer, at its first, or receiving, end. The belt is mechanically driven for moving patties along the length of the belt away from the bin or hopper and toward its second, or discharge, end. A counter is desirably positioned above or below the first conveying belt to count patties passing a selected point along the conveying belt. A gate is positioned downstream of the counter for stopping and preventing further movement beyond a second selected point. The counter and the gate are electronically interconnected so that the gate will open, or lift, when a preselected number of patties have passed by the counter. When the gate opens, the row of patties is permitted to continue moving along the conveying belt toward the discharge end of the conveying belt.

Patties reaching the end of the conveying belt are received by a constantly rotating rotary transporter. The rotary transporter comprises a pair of spaced apart, generally circular blades. A continuous series of right-angled, or saw-tooth, notches are formed in each blade, each notch having a long side that is dimensioned slightly shorter than the diameter of a frozen patty, and a short side that is slightly greater in dimension than the thickness of a frozen patty. The two blades are aligned with respect to one another so that their respective notches are in registration with one another. Each notch receives and transports a single patty as the row of patties is received from the conveying belt.

As the transporter rotates away from the conveying belt, it deposits each of the patties, one at a time, in the receiving bucket. The receiving bucket is generally arcuately shape and dimensioned so that the first patty deposited will be suspended within the bucket about its outer edges in a generally horizontally flat orientation. As subsequent patties are deposited, the first and subsequent patties are pushed into a vertical orientation until a predetermined number of patties have been deposited in the bucket. At that point, a plunger extends from between the pair of circular blades and holds the stack of patties together, while the receiving bucket rotates about its longitudinal axis to dump the stack of patties into a transport system for subsequent packaging.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

BRIEF DESCRIPTION OF THE DRAWINGS

FIG. 7 is a top view of a multi-lane apparatus comprising a plurality of apparatuses of the present invention.

DETAILED DESCRIPTION OF THE PREFERRED EMBODIMENTS

Figure 1:
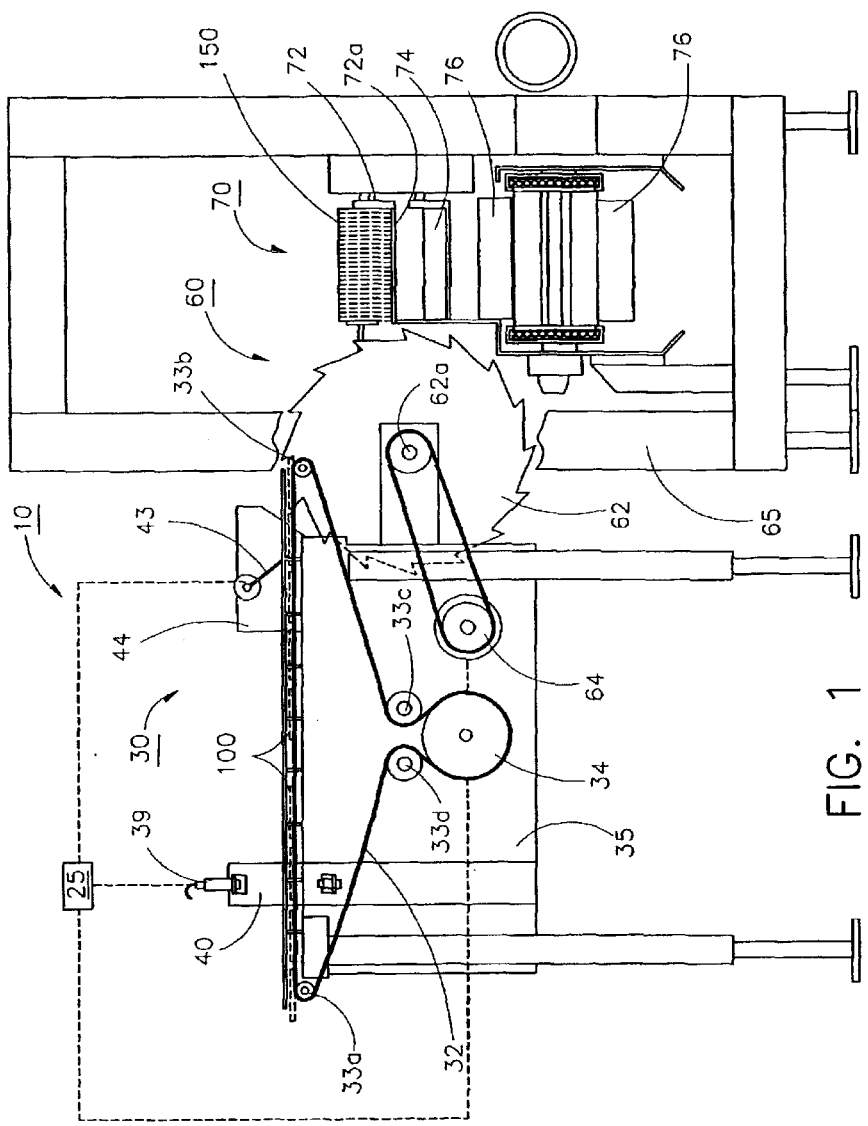
FIG. 1 is a side view of the apparatus for stacking food patties constructed according to the present invention.
Figure 2:
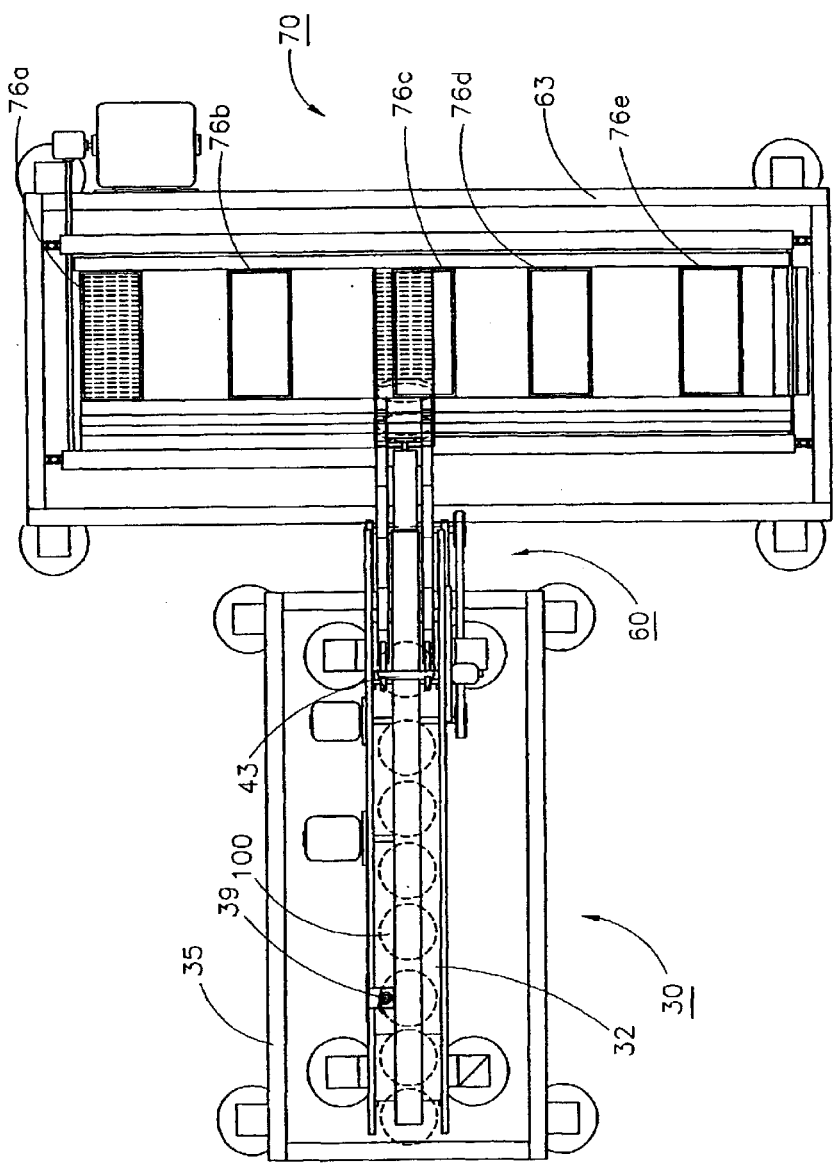
FIG. 2 is a top view of the apparatus of FIG. 1.

As shown in FIGS. 1 and 2, a first aspect of the present invention is directed to an apparatus, shown generally as 10, for counting and stacking food patties 100, such as frozen hamburgers, into horizontal cylindrical stacks for subsequent packaging, and without requiring human intervention or contact As those in the art will appreciate, the apparatus described in detail herein is not limited to use with frozen meat patties; rather, the apparatus may be used with any type of rigid or semirigid food portion, including a patty or slice, meat or non-meat, frozen or unfrozen. Further, the apparatus 10 is also not limited to the counting and stacking of food items, but could be used for counting and stacking other varieties of items where human contact and contamination are undesirable.

Generally, the apparatus 10 is comprised of a conveying belt assembly 30, a stacking assembly 60, and a stack receiver and transport assembly 70.

Figure 3:
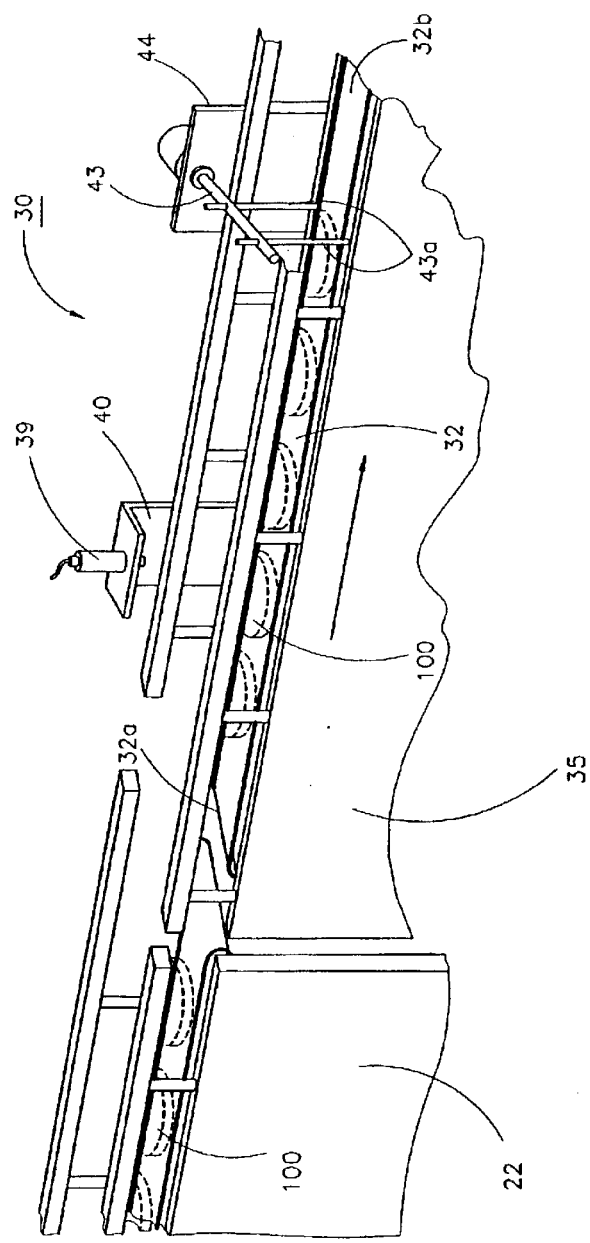
FIG. 3 is a perspective side view of the conveying belt of the apparatus of FIG. 1.

FIG. 3 is a side perspective view of the receiving, conveying belt assembly 30. Conveying belt assembly 30 comprises a continuous belt 32 assembly that is moved by and across a series of rollers 33a through 33d. The belt assembly 30 is driven by a computer controlled electrical motor 34; however, a variety of motive drive systems, electrical and non-electrical, may be employed. As shown by the arrow in FIG. 3, the belt moves in a clockwise direction, from a first, or receiving, end 32a to a second, or discharge, end 32b. The conveying belt assembly 30 is mounted on a frame 35 that is constructed to support the belt 32 and rollers 33, the drive connections (not shown), and the electric motor 34, shown in FIG. 1. The belt 32, from the receiving end 32a to the discharge end 32b, is approximately 36 inches long and approximately 5 inches wide. The belt 32 is a plastic link construction that comprises two spaced apart, parallel tracks, and is available from KVP, Inc. of Rancho Cordova, Calif. While a plastic link belt has been found suitable for the present invention, belts formed of other materials, such as flat fabric, whether as linked constructions or otherwise, may be equally suitable. The width of the belt 32 is slightly greater than the diameter of a frozen hamburger food patty 100, e.g., about 4.25 inches. The receiving end 32a of belt 32 is adapted to receive the frozen food patties 100 from a hopper, or delivery belt 22, as shown in FIG. 3.

Returning to FIG. 1, the frame 35 is preferably stainless steel or other similar metal that is easily cleaned and maintained sanitary. The electrical motor 34 that drives the first conveying belt assembly 30 is designed to repeatedly and intermittently start and stop belt 32. In operation, the electric motor 34 is sized to move belt 32 at a constant speed of about 127 feet per minute. The electric motor is a ¼ horsepower motor supplied by Lenze of Lawrenceville, Ga., as Series VDE0530. The motor 34 is controlled by a programmed computer 25.

As shown in FIG. 3, a counter 39 is positioned downstream from the discharge end 32b of the belt 32. This counter 39 is desirably a diffused electronic eye that is so positioned as to detect and count each food patty intersecting the beam of the eye. One suitable diffused electronic eye is available from Banner Engineering of Minneapolis, Minn. as Model No. S185P6FF100C. The counter 39 is mounted to a bracket 40 or other support that is secured to the frame 35 of the assembly 30.

A gate 43 is positioned downstream from counter 39. Gate 43 is mounted and supported by bracket 44 that is also affixed to the frame 35. Gate 43 is pivotally attached to bracket 44 and comprises a pivotal attachment and a plurality of times (forks) 43a that extend downward; however, the particular construction of gate 43 is not critical so long as it adequately prevents any further movement of patties along the belt. Gate 43 is electronically interconnected to the first counter 39 and controlled by computer 25.

Figure 4:
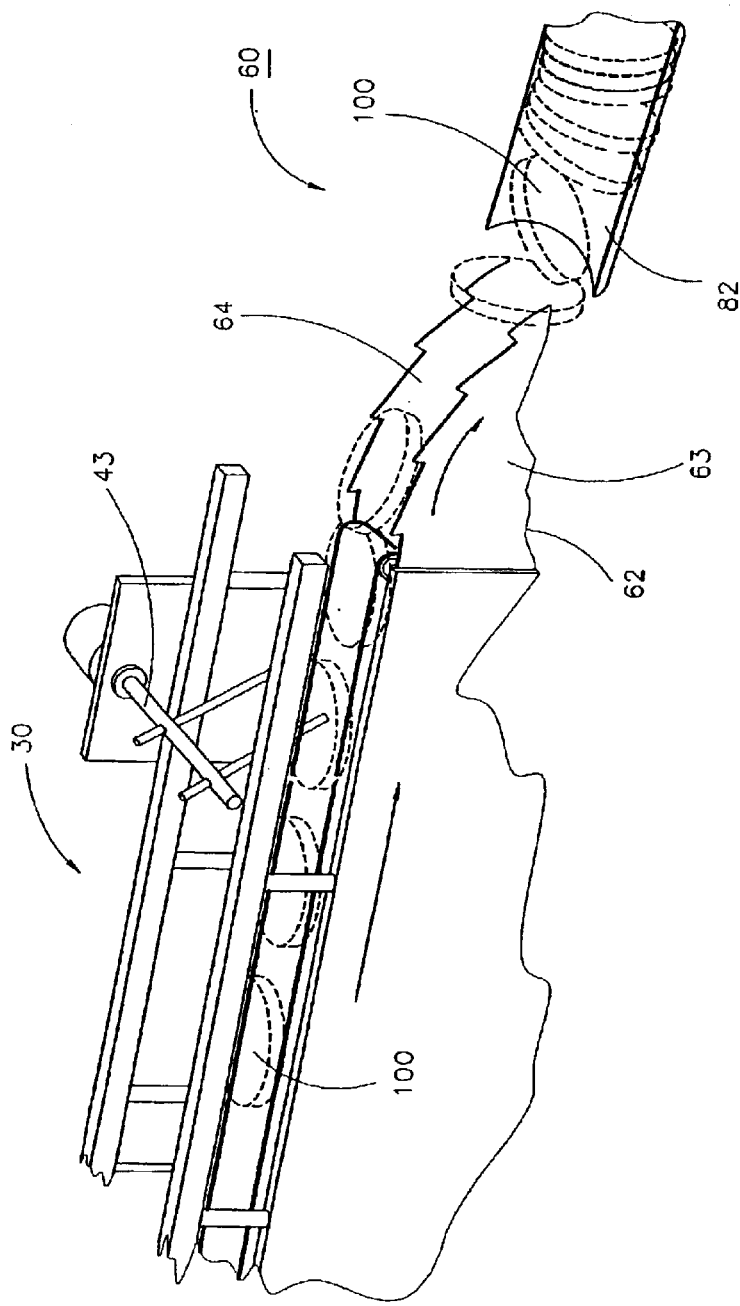
FIG. 4 is a perspective side view of the rotary transporter of the apparatus of FIG. 1.
Figure 4A:
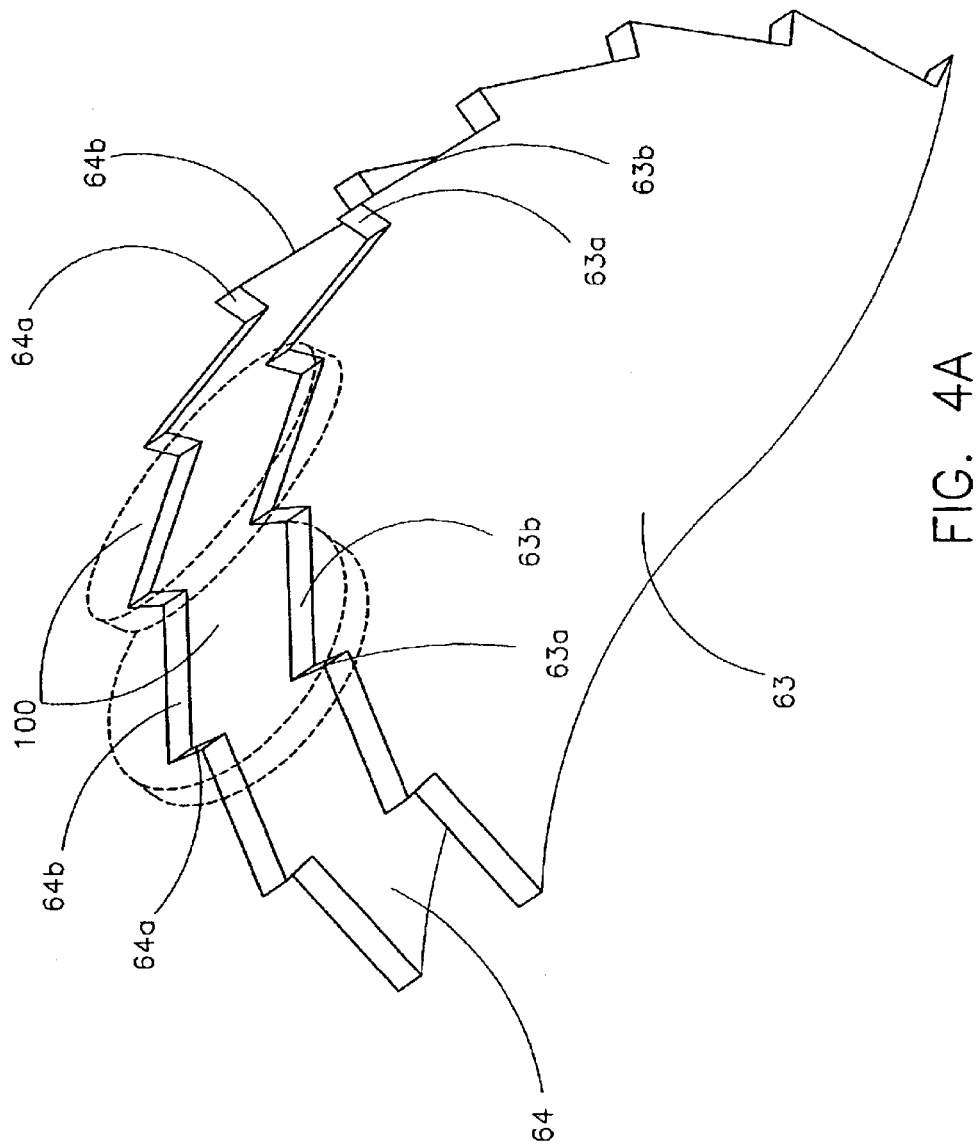
FIG. 4A is a perspective side view of the blades of the rotary transporter of the apparatus of FIG. 1.

Turning now to FIG. 4, the stacking assembly 60 comprises a rotary transporter 62 mounted on a frame 65 and driven by an electric motor 64 generally of the same type and rating as the first motor 34. The motor 64 is controlled by the programmable computer 25 and turns the rotary transporter at about 14 revolutions per minute. Rotary transporter 62 is comprised of vertically-aligned planar blades 63, 64 having their respective planar surfaces generally parallel and spaced apart from one another. Blades 63, 64 are formed of stainless steel, but material selection is not limited thereto. Right-angled notches (sawtooth type) are formed in each of the blades 63, 64. In the embodiment shown in FIGS. 1 and 4, there are 16 notches in each blade 63, 64. As best seen in FIG. 4A, short side 63a, 64a of each notch 63, 64 is dimensioned greater than the thickness of a patty 100, while the long side 63b, 64b of each notch 63, 64 is dimensioned slightly less than the diameter of a frozen patty. The short side 63a, 64a is about 15 mm deep (an average patty 100 is about 6 mm thick). This increased depth ensures that a patty being received in the notch 63, 64 does not inadvertently slide over the notch 63, 64. The long side 63b, 64b of each notch 63, 64 is about 3.5 inches in length for receiving a patty 100 having an average diameter of about 3.75 inches or greater. This causes the patties to actually overlap slightly on the rotary stacker 62 to prevent the edges of the patties 100 from butting against one another, fouling the stacking operation.

The blades 63, 64 of the rotary transporter 62 are so dimensioned that the rotation of the transporter 62 is synchronized with the speed of the belt 32. This configuration ensures that a notch is aligned to receive a patty 100 at the time that the patty 100 is moved off of the discharge end 32b of belt 32.

In one embodiment, at any point in the stacking process, no more than 4 patties are being moved and stacked by the rotary transporter 62. As the rotary transporter 62 rotates with the patties 100 nested in the paired notches, each of the patties 100 is sequentially deposited in a vertical orientation as the transporter 62 rotates across the longitudinal centerline of the receiving bucket 72. As best seen in FIG. 1, the base 72a of bucket 72 is generally in horizontal alignment with the center 62a of rotary transporter 62. Bucket 72 is arcuately shaped with a width generally conforming to the diameter of a patty 100. In this fashion, the horizontal stack of patties formed by the present invention conforms in diameter and length to the bucket 72.

Figure 5:
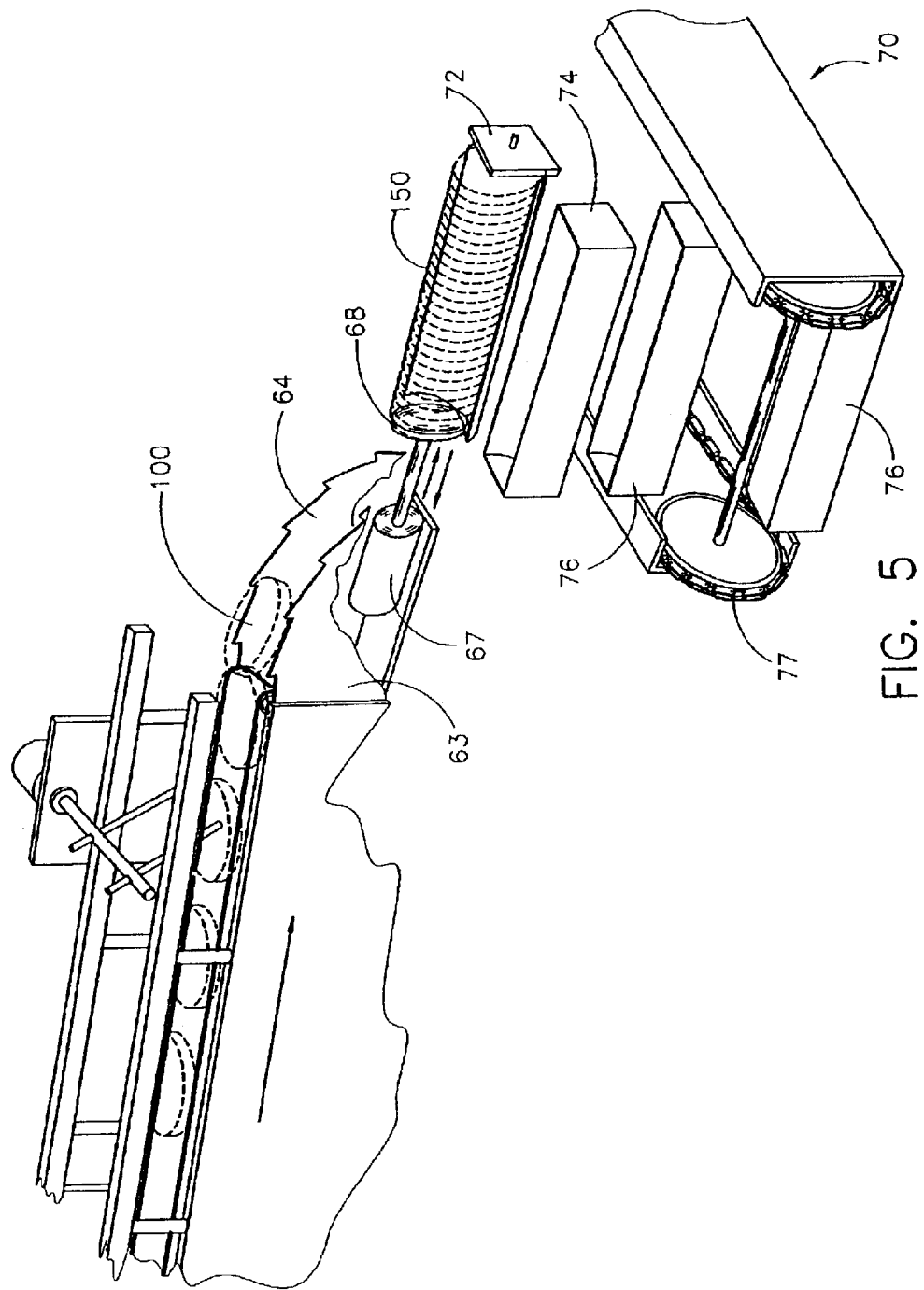
FIG. 5 is a perspective view of the rotary transporter of FIG. 4, illustrating the action of the plunger during the holding step.

When a complete stack of a predetermined number of patties 100 has been formed, the formed horizontal stack of patties 150 must be moved so that the stacking cycle can repeat until a desired number of stacks have been formed. As shown in FIG. 5, a plunger 68 is disposed between blades 63, 64. Plunger 68 is any suitable holding means and may include pistons, rams, rods, etc. Plunger 68 is positioned so that it does not interfere with the movement of patties 100 by the rotary transporter 62; however, when a complete horizontal stack 150 has been formed, the plunger 68 is programmed to extend axially outward along the horizontal centerline of the stack 150 until it snugly engages and holds the stack together. With the stack 150 firmly held, bucket 72 is rotated about its longitudinal axis until completely inverted. The plunger 68 then retracts, disengaging the stack and allowing the bucket 72 to dump the stack into an intermediate transport bucket 74.

The intermediate transport bucket 74 of the stack receiver and transport assembly 70 subsequently deposits each stack into one of a plurality of constantly moving transport buckets 76, shown in FIG. 1. A drive assembly 77 moves the transport buckets 76 to a packaging apparatus conventionally known in the art for packaging cylindrical stacks of food items.

Referring now to FIGS. 6A through 6E, the operation and steps of moving, counting, and stacking the patties will be described in detail. As will be appreciated by those skilled in the art, a conventional programmable logic controller (PLC) is employed to control the sequence and timing of the operation of the present invention.

Figure 6A:
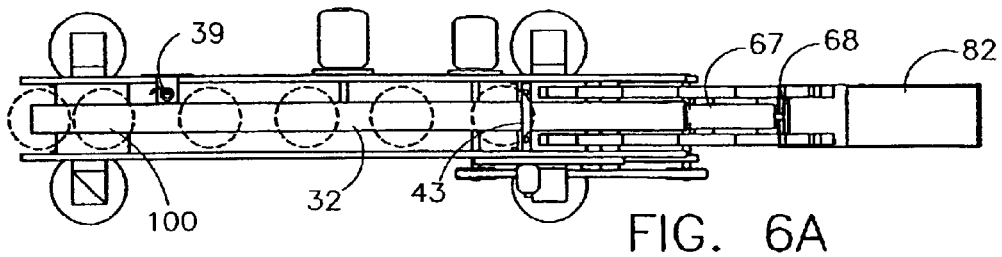
FIGS. 6A through 6E illustrate the logic and steps of the stacking method of the present invention.

The operation of the present invention begins as frozen patties 100 such as hamburgers, are moved from a freezer or hopper, or the like, along the delivery conveyer 22 and onto the receiving end 32a of belt 32. Belt 32 moves continuously throughout the entire stacking cycle. The patties 100 move along belt 32 toward the discharge end 32b, each patty passing under or by counter 39 (FIG. 6A). Gate 43, located downstream of counter 39, is initially in a down, or closed, position, which prevents the patties 100 from further movement along the belt 32 until the gate 43 is raised into an open position.

Figure 6B:
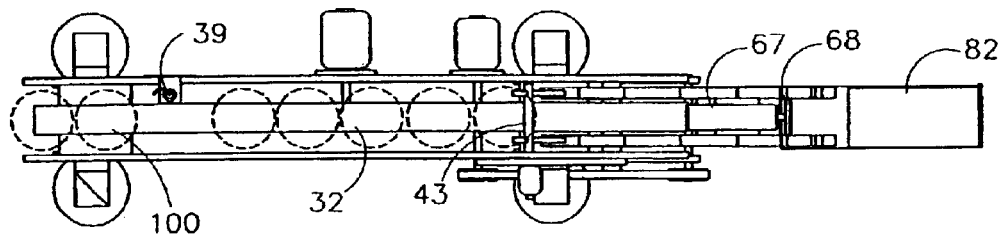

As the patties move along belt 32, they are prevented from forward movement until a predetermined number of the patties, e.g., five (5) have passed counter 39 (FIG. 6B). When counter 39 counts the predetermined number, gate 43, which is electrically interconnected to counter 39, will open and allow the patties to move along toward the discharge end 32b of belt 32.

Figure 6C:
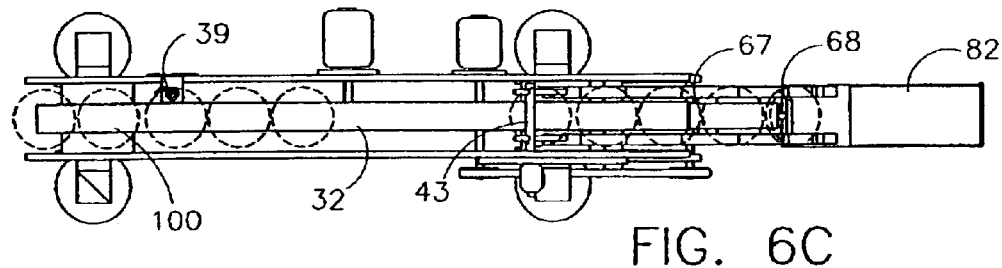
Figure 6D:
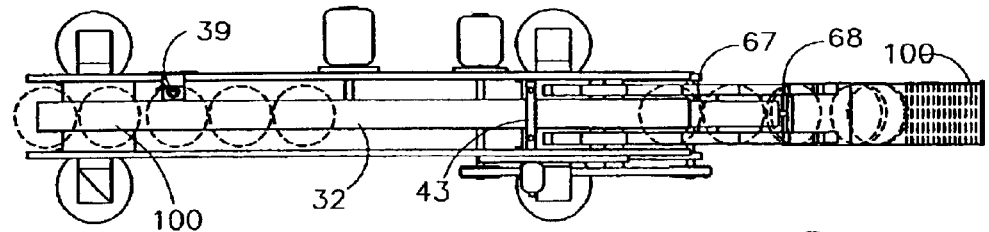

After the last of the first group of five patties passes by the gate 43, the gate closes and begins forming the next group of five patties. The rotary transporter 62 is continually rotating in the same direction as the movement of the patties and is ready to receive the first patties. As the patties arrive, each patty is received by a pair of notches of the rotary transporter (FIG. 6C). As each patty moves into a vertical position with respect to the rotary transporter, the patty is deposited in the receiving bucket 72. Because the bucket has an arcuate cross section generally conforming to the cross section of a patty, the first patty falls into a horizontal position, pivoting about its edges in the bucket. Each succeeding patty lands on a portion of the previous patty, pushing the patties into a vertical orientation in the receiving bucket 72 (FIG. 6D). Gate 43 then releases the next group of five patties, and the stacking sequence continues until a predetermined number of groups, e.g., five, have been stacked into a horizontally-oriented cylindrical stack. At this point, the receiving bucket 72 is full. While the present invention describes groups of five patties, the present invention is not limited thereto.

Figure 6E:
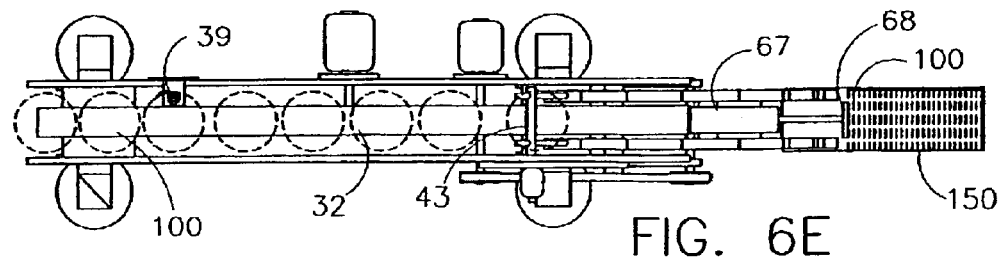

As soon as the last patty is stacked in the receiving bucket 72, the plunger 68 extends from between the opposed blades 63, 64 of the rotary transporter 62 to hold the stack 150 while the receiving bucket 72, which is pivotally mounted at its ends, rotates about its long axis to dump the stack of patties into the intermediate bucket 74 (FIG. 6E). A plurality of transport buckets 76 are spaced apart along a continuous chain drive 77, positioned below intermediate bucket 74, at intervals sufficient to match the sequence of each counting and stacking cycle. Thus, after receiving bucket 72 deposits the first stack of patties into the intermediate bucket 74, that stack is synchronized for deposit into a transport bucket 76 along the chain drive 77. Where multiple stacking apparatuses 10 are interconnected, the transport buckets 76 are sequenced thereto multiple intermediate buckets 74. Transport buckets 76 move along the chain drive 77 where they are ultimately received at a packaging point (not shown). The entire counting, stacking, and transport process has been completed without human contact.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents. For example, while the stacking apparatus has been described for a single conveyor and rotary stacker lane, it will be understood that multiple stacking apparatuses 10 may, and likely will, be interconnected for multi-lane operation. As shown in FIG. 7, a single motor 34, 64, may drive multiple stacking apparatuses simultaneously, eliminating the requirement for separate motors 34, 64 for each apparatus 10.

We claim:

1. An apparatus for stacking substantially rigid food portions in preparation for packaging, and without human intervention, comprising:
   (a) a conveyor for receiving and moving a plurality of food portions therealong;
   (b) at least one counter for counting each of the plurality of food portions as the food portion is moved by the conveyor;
   (c) a rotary transporter, said rotary transporter having a plurality of generally right-angled notches formed therein and defining peripheral edges sized for receiving a single food portion from the conveyor,
   (d) the conveyor, counter, and rotary transporter being cooperatively interconnected by a programmable computer so that a predetermined plurality of food portions is moved from said conveyor onto said transporter;
   (e) a receptacle for receiving the plurality of food portions from the rotary transporter; and
   (f) wherein the transporter deposits each one of the plurality of food portions into the receptacle to form a substantially horizontal stack of vertically oriented food portions.

2. The apparatus of claim 1 further including a regulating mechanism associated with the conveying belt for regulating the receipt of the food portions onto the rotary transporter.

3. The apparatus of claim 2 wherein the regulating mechanism includes a gate so positioned with respect to the conveying belt as to stop and start the movement of food portions onto the rotary transporter.

4. The apparatus of claim 3 wherein the counter and gate are so interconnected that the gate releases a predetermined number of food portions, that number determined by the counter.

5. The apparatus of claim 1 wherein each of said plurality of notches has a short side and a long side.

6. The apparatus of claim 5 wherein said short side is dimensioned greater than the thickness of a food portion.

7. The apparatus of claim 5 wherein said short side is dimensioned smaller than the greatest dimension of a food portion so that the food portions are caused to overlap on said rotary transporter.

8. The apparatus of claim 1 wherein said rotary transporter comprises a pair of circular, spaced-apart blades, said pair of blades aligned so that the plurality of right-angled notches formed therein are in registration.

9. The apparatus of claim 8 wherein said pair of circular blades are spaced apart by a distance less than the greatest dimension of a food portion to be received thereon said transporter.

10. The apparatus of claim 1 further including a holding means for holding together the formed stack of food portions, the holding means being selected from the group of holding means consisting of a ram, a plunger, a piston, and a rod.

11. The apparatus of claim 1, wherein the receptable is operatively connected to the programmable computer so that the receptacle automatically discharges the stack of food portions into a transport assembly for movement to a packaging apparatus.

12. The apparatus of claim 11 wherein said transport assembly comprises a plurality of transport buckets cooperatively interconnected to the receptacle by the programmable computer.

13. An apparatus for stacking frozen food portions, comprising:
   (a) a conveying belt having a first end and a second end, the conveying belt for moving a plurality of food portions from the first end to the second end;
   (b) a counter so positioned with respect to said conveying belt for determining when a predetermined number of said food portions have passed a selected point along the conveying belt;
   (c) a gate so positioned with respect to said conveying belt to prevent said food portions from moving beyond a selected point along the conveying belt; and
   (d) a rotary transporter having a plurality of generally right-angled notches formed therein and defining peripheral edges sized for receiving a single food portion from the conveyor;
   (e) a receptacle for receiving the plurality of food portions from the rotary transporter; and
   (f) wherein the conveying belt, counter, and transporter are cooperatively interconnected by a programmable computer so that the food portions are is moved along said conveyor where the transporter deposits each one of the portions into the receptable to form a stack.

14. A multiple lane system for stacking substantially rigid food portions in preparation for packaging, and without human intervention, comprising:
   (a) a plurality of stacking apparatuses, each stacking apparatus comprising:
      (i) a conveyor for receiving and moving a plurality of food portions therealong;
      (ii) at least one counter for counting each of the plurality of food portions as the food portion is moved by the conveyor;
      (iii) a rotary transporter, said rotary transporter having a plurality of generally right-angled notches formed therein and defining peripheral edges sized for receiving a single food portion from the conveyor;
      (iv) the conveyor, counter, and rotary transporter being cooperatively interconnected by a programmable computer so that a predetermined plurality of food portions is moved from said conveyor onto said transporter;
      (v) a receptacle for receiving the plurality of food portions from the rotary transporter; and
      (vi) where the transporter deposits each one of the plurality of food portions into the receptacle to form a substantially horizontal stack of vertically oriented food portions; and
   (b) at least one motor for simultaneously driving the plurality of stacking apparatuses.

15. A method for stacking frozen food portions without human intervention in preparation for packaging, comprising:
   (a) moving a plurality of food portions along a conveyor;
   (b) receiving said food portions from said conveyor on a rotary transporter having notches that are sized for receiving and transporting single food portions; and
   (c) depositing each one of the plurality of food portions into a receptacle to form a substantially horizontal stack of vertically oriented portions.

16. The method of claim 15 wherein the step of moving the plurality of food portions along the conveyor comprises providing a gate for automatically forming groups of food portions of a predetermined number for subsequent movement onto the rotary transporter.

17. The method of claim 15 further including the step of automatically depositing the formed horizontal stack of food portions into a transport means for subsequent packaging without human contact or intervention.

* * * * *